(12) United States Patent
Forgang et al.

(10) Patent No.: US 7,586,309 B2
(45) Date of Patent: Sep. 8, 2009

(54) APPARATUS AND METHOD FOR GUIDING ENERGY IN A SUBSURFACE ELECTROMAGNETIC MEASURING SYSTEM

(75) Inventors: Stanislav Forgang, Houston, TX (US); Randy Gold, Houston, TX (US)

(73) Assignee: Baker Hughes, Inc., Houston, TX (US)

( * ) Notice: Subject to any disclaimer, the term of this patent is extended or adjusted under 35 U.S.C. 154(b) by 0 days.

(21) Appl. No.: 11/256,393

(22) Filed: Oct. 21, 2005

(65) Prior Publication Data
US 2007/0090842 A1  Apr. 26, 2007

(51) Int. Cl.
*G01V 3/08* (2006.01)
(52) U.S. Cl. .................. 324/336; 324/334; 324/337
(58) Field of Classification Search .............. 324/334, 324/337, 336, 326, 329, 332, 338, 339, 344
See application file for complete search history.

(56) References Cited

U.S. PATENT DOCUMENTS

| | | | | |
|---|---|---|---|---|
| 3,890,563 | A * | 6/1975 | Dowling et al. ............ | 324/340 |
| 4,808,925 | A * | 2/1989 | Baird ........................ | 324/221 |
| 5,463,319 | A * | 10/1995 | Chesnutt et al. ............ | 324/339 |
| 5,757,186 | A * | 5/1998 | Taicher et al. .............. | 324/303 |
| 2002/0105333 | A1 * | 8/2002 | Amini ........................ | 324/338 |
| 2003/0184299 | A1 | 10/2003 | Strack | |
| 2003/0197510 | A1 | 10/2003 | Gianzero et al. | |
| 2004/0056663 | A1 * | 3/2004 | Sinclair et al. .............. | 324/367 |
| 2004/0178794 | A1 | 9/2004 | Nelson | |
| 2005/0017722 | A1 | 1/2005 | Ellingsrud et al. | |
| 2005/0030059 | A1 | 2/2005 | Tabarovsky et al. | |
| 2005/0162162 | A1 * | 7/2005 | Itskovich et al. ............ | 324/303 |
| 2005/0242819 | A1 | 11/2005 | Gold et al. | |
| 2005/0253589 | A1 | 11/2005 | Fabris et al. | |
| 2005/0264295 | A1 | 12/2005 | Strack et al. | |
| 2006/0015255 | A1 | 1/2006 | Sorensen | |

OTHER PUBLICATIONS

French, Rowland, Time-Domain Electromagnetic Exploration, Northwest Geophysical Associates, Inc. (2002).

* cited by examiner

*Primary Examiner*—Patrick J Assouad
*Assistant Examiner*—David M. Schindler
(74) *Attorney, Agent, or Firm*—Gordon T. Arnold; Charles S. Knobloch; Arnold & Knobloch, L.L.P.

(57) ABSTRACT

A device for guiding energy in a subsurface electromagnetic measuring system is provided, the device including a transmitting member for transmitting an electromagnetic signal into a subsurface medium, an energy-guiding member disposed in magnetic communication with the electromagnetic signal, and a receiving member for receiving a return signal induced from the subsurface medium. A method of guiding energy in a subsurface measuring system is also provided, the method including transmitting an electromagnetic signal into a subsurface medium, modifying the electromagnetic signal using a magnetic field, and then receiving a modified return signal induced from the medium using a receiving member.

20 Claims, 2 Drawing Sheets

APPARATUS AND METHOD FOR GUIDING ENERGY IN A SUBSURFACE ELECTROMAGNETIC MEASURING SYSTEM

BACKGROUND OF THE INVENTION

Well logging is a representative example of known subsurface measuring techniques used in the oil and gas industry to identify and record various properties associated with a subsurface geological formation, so that hydrocarbon reserves disposed in regions intersecting a drilled wellbore can be identified and produced. The specific formation properties sought during well logging include, but are not limited to, descriptive and quantitative evaluations of surrounding rock formations, and the type and amount of hydrocarbons contained therein. Typically, intersecting regions of discernible hydrocarbon reserves constitute around one percent or less of the total wellbore profile.

In a presently known well logging protocol practiced by Baker Hughes, Inc. of Houston, Tex., a logging system having at least the following components is employed: a downhole measurement system used to measure formation data (e.g., a galvanic resistance type formation imager); a computerized surface data acquisition system used to store and analyze retrieved data; a cable or wireline used as a mechanical and data communication link with the downhole measurement system; and a hoist of some type used to raise and lower the measurement system within the wellbore.

In one embodiment, the formation imager is first lowered to the bottom of the well, and then slowly retrieved, with adjacent geological formations being probed as the imager is lowered and raised. This process provides a continuous stream of data up the wireline to a surface acquisition device, such as a computer or other processor. The retrieved data is then recorded on a "log" that displays information about the formation as a function of depth. The data is also recorded in a digital format for subsequent processing. Since no single measurement can definitively determine the presence of hydrocarbons in a downhole formation, numerous iterations of the process are usually carried out in order to obtain the desired information. Only if a well is believed to contain hydrocarbons in amounts that are economically viable to recover will a well be completed and produced.

The quantity of data sought at each depth interval depends primarily on its proximity to the formation thought to contain hydrocarbons. Above and away from this zone of interest, only minimal measurements are typically performed. These measurements map the formations being penetrated, and track progress in completing and producing the well. Closer to and across the projected hydrocarbon bearing zone, the measurements are extremely detailed and can take many hours (or days) to complete.

A disadvantage of known well logging systems, however, is that the imagers generally fail to focus on data obtained from further, more distant points deep within the formation believed to contain hydrocarbons, and instead considers all data equally, even data obtained from closer, more widespread regions in which no hydrocarbons are believed to exist. For example, since the imagers generally lack a means of guiding current induced from the formation, data points localized in remote, offset regions of a measured formation are treated as equally relevant as points localized deep within the confines of a known reserve. Accordingly, there has to date been a significant need for an apparatus and method of guiding energy in a subsurface electromagnetic measuring system in which offset data points far removed from suspected reserves are neglected, and the spatial resolution of data points localized deeper within suspected reserves is better defined.

SUMMARY OF THE INVENTION

An apparatus for guiding energy in a subsurface electromagnetic measuring system is provided, including a transmitting member for transmitting an electromagnetic signal into a subsurface medium; a receiving member for receiving said electromagnetic signal when said electromagnetic signal is returned from said subsurface medium; and an energy-guiding member disposed in magnetic communication with at least one of said transmitting member and said receiving member.

A method of guiding energy in a subsurface electromagnetic measuring system is also provided, including transmitting an electromagnetic signal into a subsurface medium; receiving said electromagnetic signal when said electromagnetic signal is returned from said subsurface medium; and modifying said electromagnetic signal using a magnetic device.

DETAILED DESCRIPTION

The present invention is directed generally to an apparatus and method for guiding energy in a subsurface electromagnetic measuring system, and in a particular, non-limiting embodiment, to a subsurface formation imager used to increase the spatial resolution of measurements logged in the time domain using dynamic magnetic fields transmitted into and out of an associated geological formation. When a primary electromagnetic transmission field is transmitted toward the formation, a steady state magnetic field is achieved. After the steady state magnetic field is established, current is discontinued, and an electrical response is induced from the formation immediately after the primary field changes its magnetic state. The induced electrical response occurs in accord with Faraday's law, which states that a change in the magnetic environment of a coil will cause a voltage to be induced within the coil.

In one embodiment of the invention, an apparatus is provided comprising an induction type transmitter-receiver coil equipped with an energy-guiding member. In another embodiment, the energy-guiding member further comprises a non-conductive magnet. In a still further embodiment, the energy-guiding member further comprises a direct current (DC) non-conductive magnet.

By guiding a magnetic field over transient currents induced from the formation, the rate at which the transient currents diffuse is greatly reduced, and an increase in the axial beam length of the current density is realized. Since the current density is axially increased over a longer distance than would otherwise be possible in an arrangement lacking an energy-guiding member, greater vertical and azimuthal resolution of discontinuities in the formation's homogeneity are achieved.

Figure 1A:
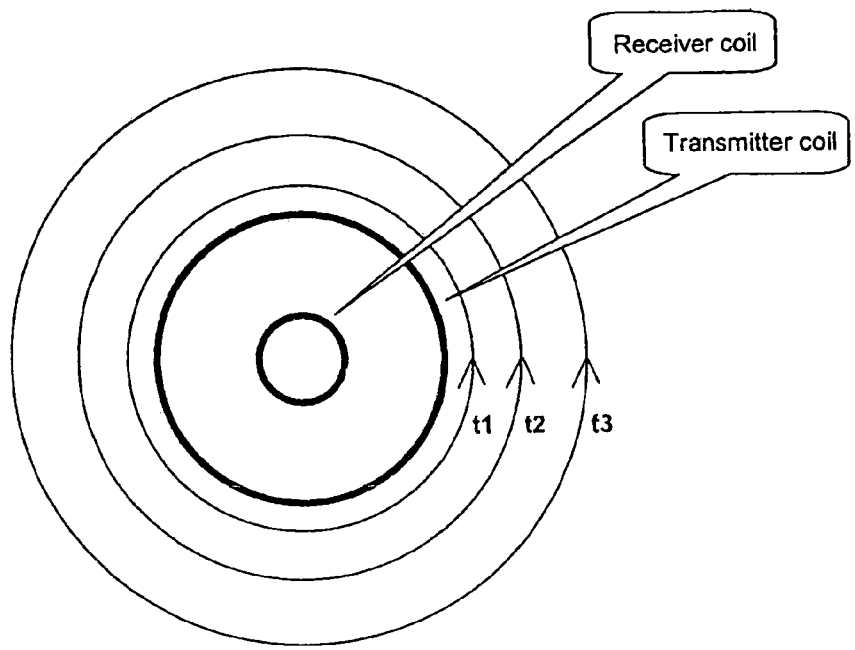
FIG. 1A depicts an apparatus for guiding energy in a subsurface electromagnetic measuring system, wherein a signal sensor includes a transmitter and a receiver, and wherein the shape and position of a current induced from a geological formation in the −XY direction are depicted.

For example, in the specific, though non-limiting, embodiment of the invention depicted in FIG. 1A, a subsurface measuring system is provided comprising at least one transmitting coil and at least one receiving coil. In this particular embodiment, both the transmitting and receiving coils essentially comprise induction loops, disposed in a co-planar manner such that their magnetic axes are oriented either perpendicular to the formation being investigated or in the radial direction of an associated measuring system. A single coil (or multiple coils) can also be used for both transmitting and receiving the electrical signals, and many other equally effective system configurations will occur to those of ordinary skill in the art.

In the embodiment depicted in FIG. 1A, the coils have an approximately radial shape, though many other shapes, orientations and transmitting and receiving devices can be employed without departing from either the scope or spirit of the invention. For example, either (or both) of the transmitting coils or receiving coils can be disposed in a non-radial manner if dictated by the exploration environment, and the receiving coil can be replaced by either a magnetometer or another receiving device capable of directly measuring changes in a magnetic field rather than an electric field.

In some embodiments, a radial transmitting coil is disposed near the formation being investigated in a manner such that the circumferential relation of the current density rings induced as a function of time t are defined by the expression $t_1 < t_2 < t_3$, where $t_n$ reflects the time at which an electrical signal was transmitted. When current is applied to the transmitting coil, a magnetic field associated therewith is also imposed on the formation. In certain embodiments, the magnetic field imposed on the formation assumes the form of a pulse sequence.

After a steady state magnetic field has been established, current is discontinued (which naturally changes the state of the magnetic field), and a responsive current is induced from the formation immediately after the change in magnetic state. A responsive current density is then projected and mapped onto the surface of an associated –XY plane. In the alternative embodiment depicted in FIG. 1B, a measuring system similar to the system depicted in FIG. 1A is provided, except that the axis of the magnetic field has been changed such that the shape and position of the current induced in the formation is disposed in the –XZ direction.

Figure 1B:
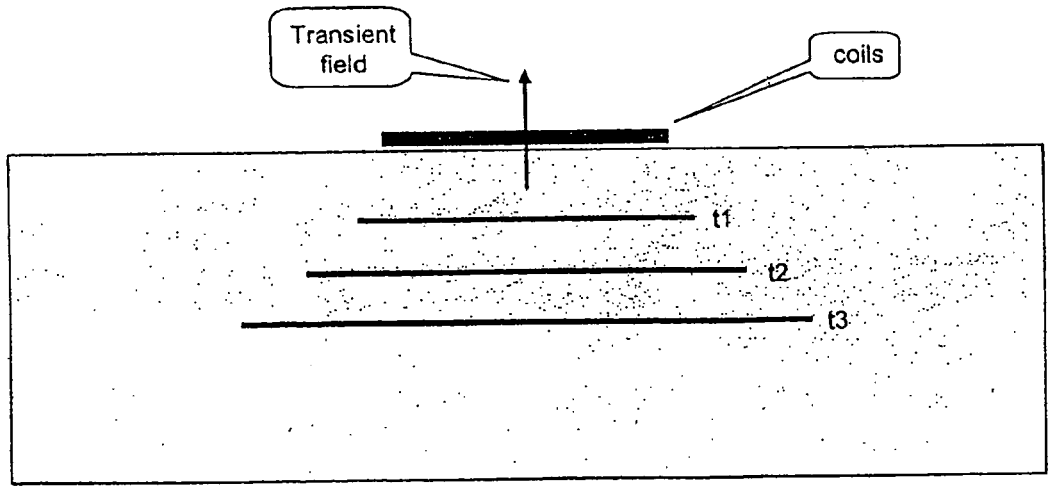
FIG. 1B depicts the apparatus for guiding energy in a subsurface electromagnetic measuring system shown in FIG. 1A, except that the shape and position of the current induced from the formation is disposed in the −XZ direction.

The particular current density characteristics depicted in FIGS. 1A and 1B (i.e., an approximately concentric pattern disposed in either the –XY or –XZ direction) is sometimes referred to as a "smoke ring" pattern, and has previously been described by others in the art. See, for example, Nabighian, Misac, *Electromagnetic Methods in Applied Geophysics,* IG#3, Vol. 1&2 (1988), or French, Rowland, *Time-Domain Electromagnetic Exploration,* Northwest Geophysical Associates, Inc. (2002).

A deficiency in the measurements of currents propagated in such a fashion, however, is that the radius of the rings tends to expand very quickly as a function of time. Consequently, the induced current also tends to weaken as a function of the ring's radial circumference, and a deeper axial penetration that might detect discontinuities in formation homogeneity is prevented.

Figure 2:
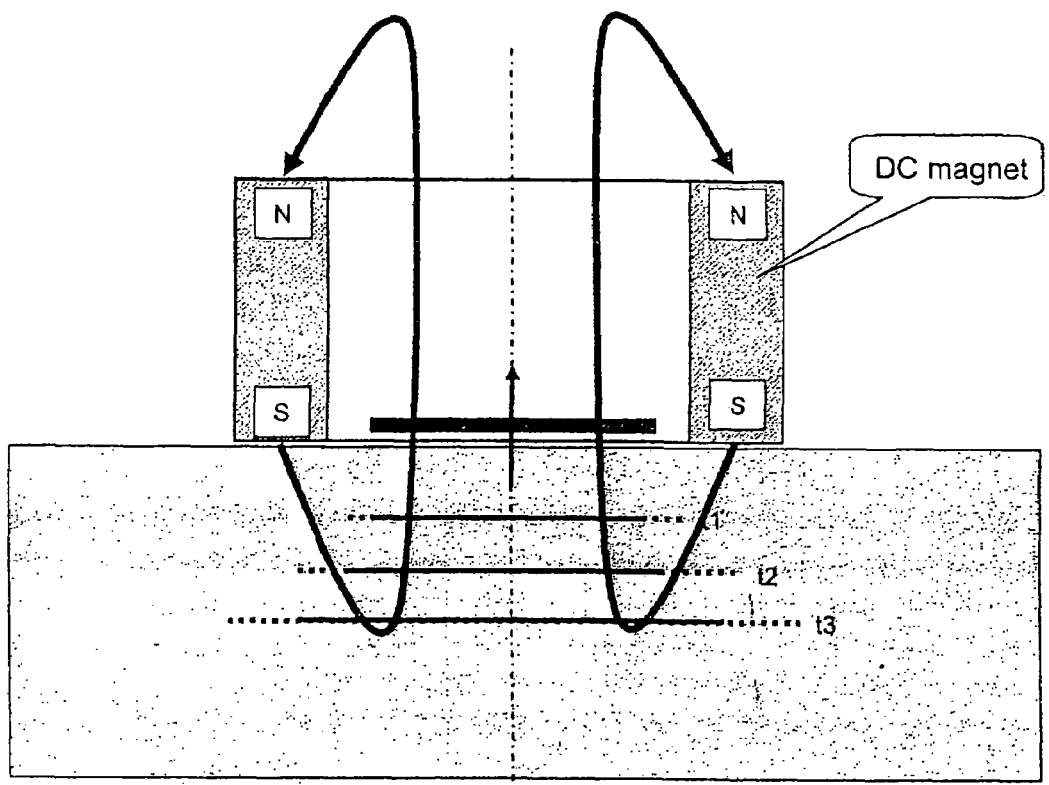
FIG. 2 depicts an apparatus for guiding energy in a subsurface electromagnetic measuring system according to the invention, wherein the current induced from a formation is disposed in communication with an energy-guiding member.

As seen in FIG. 2, therefore, the invention also interposes an energy-guiding means (for example, a magnetic field), so that the beam length in the axial direction is improved at the expense of radial diffusion. For example, according to the Lorentz force law $F = qE + qv \times B$ (where qE is the electric force and qv X B is the magnetic force), a magnetic field imposed over an induced current will, according to the well-known right-hand rule, control the direction of associated charge carriers.

Depending on the orientation of the transmitting field, the resulting force will either push charge carriers inward toward the axis of symmetry, or outwards away from the axis of symmetry. In the case where charge carriers are pushed inward toward the axis of symmetry, an enhanced axial beam length is realized, and the formation is penetrated more deeply than would otherwise be realized. As a result, better vertical and azimuthal resolution of the formation is achieved, and inhomogeneities disposed deeper in the formation are detected. Conversely, if the charge carriers are pushed away from the axis of symmetry, the formation is probed more broadly, and the beam length of the induced current is reduced.

In the embodiment depicted in FIG. 2, for example, a measuring system is provided such that charge carriers are pushed back toward the axis of symmetry. As a result, current induced in the formation in the presence of the magnetic field probes deeper into the formation in an axial direction, and more distant points disposed outside the zone of interest are neglected.

In one example embodiment, the energy-guiding means comprises a coaxial magnet disposed in electromagnetic communication with a transmitting coil (as depicted in FIG. 2). In other embodiments, a cylindrical coaxial magnet is employed in order to assist in the propagation of a more concentrated and uniform current density pattern. In still other embodiments, however, the magnet is not cylindrical, and is instead shaped according to the requirements of a particular logging application.

In some embodiments, the magnet is formed from a non-conductive material so that interference and current dissipation is minimized. In alternative embodiments, however, the magnet is formed from a semi-conductive material that admits to advantages of the invention over a shorter formation distance. In further embodiments, the energy-guiding means is employed in conjunction with a magnetometer or the like, so that changes in associated magnetic fields are measured directly, whereas in still further embodiments the changes in current density attributable to the presence of a magnetic field are measured indirectly, as would be the case with a standard receiving coil.

The foregoing specification is provided for illustrative purposes only, and is not intended to describe all possible aspects of the present invention. Moreover, while the invention has been shown and described in detail with respect to several exemplary embodiments, those of ordinary skill in the pertinent arts will appreciate that minor changes to the description, and various other modifications, omissions and additions may also be made without departing from either the spirit or scope thereof.

The invention claimed is:

1. A subsurface electromagnetic measuring system comprising:
   a transmitting member arranged to induce transient currents in a formation;
   a fixed magnet positioned to be in magnetic communication with said transmitting member and the formation; and a receiving member positioned to generate a signal in response to the transient currents, wherein diffusion of the transient currents is affected by said fixed magnet.

2. The apparatus of claim 1, wherein said transmitting member and said receiving member are formed in a structurally integrated device.

3. The apparatus of claim 1, wherein said transmitting member further comprises a transmitting coil.

4. The apparatus of claim 1, wherein said receiving member further comprises a receiving coil.

5. The apparatus of claim 1, wherein said receiving member further comprises a magnetometer.

6. The apparatus of claim 1, wherein said fixed magnet further comprises an electromagnet.

7. The apparatus of claim 1, wherein said fixed magnet further comprises a magnet positioned substantially coaxial with the transmitting member.

8. The apparatus of claim 7, wherein said fixed magnet further comprises a DC magnet positioned substantially coaxial with the transmitting member.

9. The apparatus of claim 1, wherein said fixed magnet further comprises a magnet formed from a non-conductive material.

10. The apparatus of claim 1, wherein said fixed magnet further comprises a magnet formed from a semi-conductive material.

11. A method of measuring a subsurface formation, said method comprising:
applying a fixed magnetic field to the subsurface formation;
transmitting an electromagnetic signal into the subsurface formation to establish a steady state;
terminating the electromagnetic signal after the steady state is established whereby transient currents are induced in the subsurface formation substantially non-parallel to the fixed magnetic field; and
receiving a return signal from said subsurface formation, wherein diffusion of the transient currents is affected by the fixed magnetic field.

12. The method of claim 11, wherein said transmitting an electromagnetic signal into the subsurface formation further comprises transmitting an electromagnetic signal using a transmitting coil.

13. The method of claim 11, wherein said receiving a return signal further comprises receiving an electromagnetic signal using a receiving coil.

14. The method of claim 11, wherein said receiving a return signal further comprises receiving an electromagnetic signal using a receiving member capable of detecting changes in a magnetic field.

15. The method of claim 14, wherein said receiving a signal from the subsurface formation comprises using a magnetometer.

16. The method of claim 11, wherein said applying a fixed magnetic field to the subsurface formation comprises using an electromagnet.

17. The method of claim 12, wherein said applying a fixed magnetic field to the subsurface formation comprises using a fixed magnet positioned substantially coaxial with the transmitting coil.

18. The method of claim 11, wherein said applying a fixed magnetic field to the subsurface formation further comprises using a fixed magnet formed from a non-conductive material.

19. The method of claim 11, wherein said applying a fixed magnetic field to the subsurface formation further comprises using a fixed magnet formed from a semi-conductive material.

20. A subsurface electromagnetic measuring system for use in a wellbore comprising:
a transmitting member arranged to induce transient currents in a subsurface formation;
a fixed magnet arranged to interpose a magnetic field in the subsurface formation substantially non-parallel to the transient currents; and
a receiving member positioned to generate a signal in response to the transient currents, wherein diffusion of the transient currents is affected by said fixed magnet.

* * * * *